United States Patent
Karner et al.

(10) Patent No.: US 7,573,228 B2
(45) Date of Patent: Aug. 11, 2009

(54) APPARATUS AND METHOD FOR MANAGING POWER TO AN AIRPORT PASSENGER BRIDGE AND A BATTERY CHARGER

(75) Inventors: Donald Bruce Karner, Phoenix, AZ (US); Kevin Patrick Morrow, Mesa, AZ (US)

(73) Assignee: Electric Transportation Engineering Corporation, Phoenix, AZ (US)

( * ) Notice: Subject to any disclaimer, the term of this patent is extended or adjusted under 35 U.S.C. 154(b) by 508 days.

(21) Appl. No.: 11/158,392

(22) Filed: Jun. 21, 2005

(65) Prior Publication Data

US 2005/0280399 A1    Dec. 22, 2005

Related U.S. Application Data

(60) Provisional application No. 60/581,926, filed on Jun. 21, 2004.

(51) Int. Cl.
*H01M 10/46* (2006.01)
(52) U.S. Cl. .................................... 320/104
(58) Field of Classification Search ............ 320/104, 320/107, 114
See application file for complete search history.

(56) References Cited

U.S. PATENT DOCUMENTS 5,754,445 A     5/1998  Jouper et al.
6,639,198 B2 *  10/2003 Riess et al. ............ 219/660

2003/0222867 A1 * 12/2003 Bean et al. ............ 345/211

OTHER PUBLICATIONS

PosiCharge MVS PowerServer and PowerStation product data sheet MVS0201, 2001, AeroVironment Inc., www.posicharge.com.
PosiCharge ELT product data sheet ELT0201, 2001, AeroVironment Inc., www.posicharge.com.
PosiCharge GSE product data sheet EXGSE, 2001, AeroVironment Inc., www.posicharge.com.
MDC-01 product data sheet, retrieved on Sep. 23, 2003, Carrel & Carrel Ltd., http://www.carrel.co.nz/transducer/mdc-01.htm.
Energy Access—Energy Sentry Demand Controller product data sheet, retrieved on Sep. 23, 2003, The Energy Savings Company, http://adec3m.com/ Energy% 20Centry/demandcon.html.
K-MAC Phase III Demand Controller: How the system works, retrieved on Sep. 23, 2003, Bridgestone Energy Services Limited, http://www.brdgstn.com/kmac.htm.

* cited by examiner

*Primary Examiner*—Edward Tso
(74) *Attorney, Agent, or Firm*—Stinson Morrison Hecker LLP

(57) ABSTRACT

An apparatus for managing input power between a passenger bridge and a battery charger includes a power distributor, a current monitor and a controller. The power distributor receives input power and outputs power to the passenger bridge and the battery charger. The current monitor measures current drawn by the passenger bridge and the battery charger to provide a signal to the controller indicative of the power consumption of the passenger bridge and the battery charger. The controller adjusts the output power setting of the battery charger in response to the power consumption of the passenger bridge and the battery charger by reading the output power of the battery charger, comparing the power consumption of the passenger bridge and the battery charger to a predetermined operating threshold to determine whether an overthreshold condition exists, and modulating the battery charger output power setting in response to the overthreshold condition.

22 Claims, 4 Drawing Sheets

APPARATUS AND METHOD FOR MANAGING POWER TO AN AIRPORT PASSENGER BRIDGE AND A BATTERY CHARGER

RELATED APPLICATION DATA

This application is based on and claims the benefit of U.S. Provisional Patent Application No. 60/581,926 filed on Jun. 21, 2004, the disclosure of which is incorporated herein by this reference.

BACKGROUND

This invention relates to electrical power management and battery charging. More particularly, it relates to an apparatus and method that allow a battery charger to share the power available from an electrical supply with one or more other pieces of electrically operated equipment, such as an airport passenger bridge, while charging single or multiple batteries.

The airline industry has long employed vehicles around and on airport tarmacs to support airline operations. Until recently, these vehicles, or ground support equipment (GSE), have been predominantly powered by internal combustion engines that burned gasoline or diesel fuel. With the advances in technology related to electrically powered vehicles, such vehicles have become more cost effective to operate and have become more prevalent as ground support equipment. In particular, advances in battery and battery charging technology have made these vehicles more serviceable. Additionally, the improvements in air quality realized by reducing emissions from internal combustion engines have resulted from the increased use of electrically powered ground support equipment.

While the use of electrically powered ground support equipment has reduced the demand for petroleum-based fuels at airport facilities, the demand on the electrical power sources at these facilities has increased. Heretofore, dedicated electrical power supply circuits have been provided for the battery charging required to support electrically powered ground support equipment. Often the power supply must be run considerable distances, and additional electrical distribution centers have been installed to support battery charging at these load centers. This has added significantly to the expense of introducing electrically powered ground support equipment at airports.

We have recognized that one possible approach to mitigating the need to add electrical power capacity at airports is to have the ground support equipment battery charging circuitry share existing electric power with equipment that is used on a low duty cycle basis. One such piece of equipment is a passenger bridge. Airport passenger bridges provide the conduit between airplane and terminal gate for the loading and unloading of passengers. The passenger bridge is powered into position upon aircraft arrival at the gate and is returned to its stored position just prior to aircraft departure. Between uses, there are substantial periods of time during which no power is required by the passenger bridge, but the electrical power source must be capable of providing the power to the bridge when it is called upon to do so.

Sharing electric power between other equipment and battery chargers for ground support equipment, however, presents problems. Some generic load management devices (also called demand management systems) advertise their use with battery chargers. However, their interface with the battery charger is to simply disconnect the electrical supply to the charger. For very simple, low-power chargers this method may provide acceptable results. For large sophisticated battery chargers such as those utilized by electrical powered ground support equipment, however, the charge algorithm that defined the battery charging profile will not appropriately restart from multiple power interruptions likely with generic demand management systems. This renders such systems ineffective for use with ground support equipment.

There is a need, therefore, to effectively and inexpensively supply electrical power to airport ground support equipment battery chargers. It is an object of the present invention to provide such an apparatus and method for doing so.

It is another object of this invention to provide such an apparatus and method that efficiently shares an existing electrical power source between an airport passenger bridge and a battery charger supporting ground support equipment.

It is yet another object of this invention to provide such an apparatus and method that is fully extensible to include two or more airport passenger bridges.

It is still another object of this invention to provide such an apparatus and method that is fully extensible to include two or more battery chargers supporting ground support equipment.

It is yet another object of this invention to provide such an apparatus and method that efficiently shares an existing electrical power source between an AC load and a battery charger.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided an apparatus for managing input power between a passenger bridge and a battery charger having a controllable output power setting. The apparatus includes a power distributor, a controller and a current monitor. The power distributor has an input for receiving input power, a bridge power output for coupling to a power input of the passenger bridge and a charger output for coupling to a power input of the battery charger. The controller is configured to adjust the output power setting of the battery charger in response to the power consumption of the passenger bridge and the battery charger. The current monitor is configured to measure current drawn by the passenger bridge and the battery charger and is coupled to the controller to provide a signal indicative of the power consumption of the passenger bridge and the battery charger. In one embodiment, the controller is configured to read the output power of the battery charger, compare the power consumption of the passenger bridge and the battery charger to a predetermined operating threshold to determine whether an overthreshold condition exists, and modulate the battery charger output power setting in response to the determination whether an overthreshold condition exists. The controller can be configured to inhibit modulation of the battery charger output power setting in response to transient power spikes and to inhibit modulation of the battery charger output power setting that may damage the battery charger.

A method is provided for managing input power between a passenger bridge and a battery charger having a controllable output power level is also provided. The method includes the steps of taking a measurement indicative of power consumption of the passenger bridge and the battery charger and using the measurement to control the output power level of the battery charger. The measurement can be achieved by measuring the current drawn by the passenger bridge and the battery charger. The measurement can be used to control the output power setting of the battery charger by: reading the output power of the battery charger; comparing the power consumption of the passenger bridge and the battery charger to a predetermined operating threshold to determine whether an overthreshold condition exists; and modulating the battery charger output power setting in response to the determination whether an overthreshold condition exists. Modulating the battery charger can include adjusting the battery charger output setting to one of a plurality of output power setting levels. The method also can include providing an overthreshold signal indicative of whether an overthreshold condition exists and integrating the overthreshold signal to filter out any transient spikes in the power consumption and integrating the overthreshold signal to avoid frequent changes in the battery charger output setting that may damage the battery charger.

The apparatus and method of the invention allow one or more battery chargers to share the power available from an electrical supply with one or more other pieces of electrical equipment. In the preferred embodiment, the battery charger is for airport electric ground support equipment and the electrical supply is for an existing passenger bridge. The apparatus can be connected to the electrical branch circuit serving that passenger bridge and eliminates the need to install a new electrical branch circuit specifically for the battery charger. This provides a tremendous cost savings when electric ground support equipment is being installed.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DESCRIPTION

Figure 1:
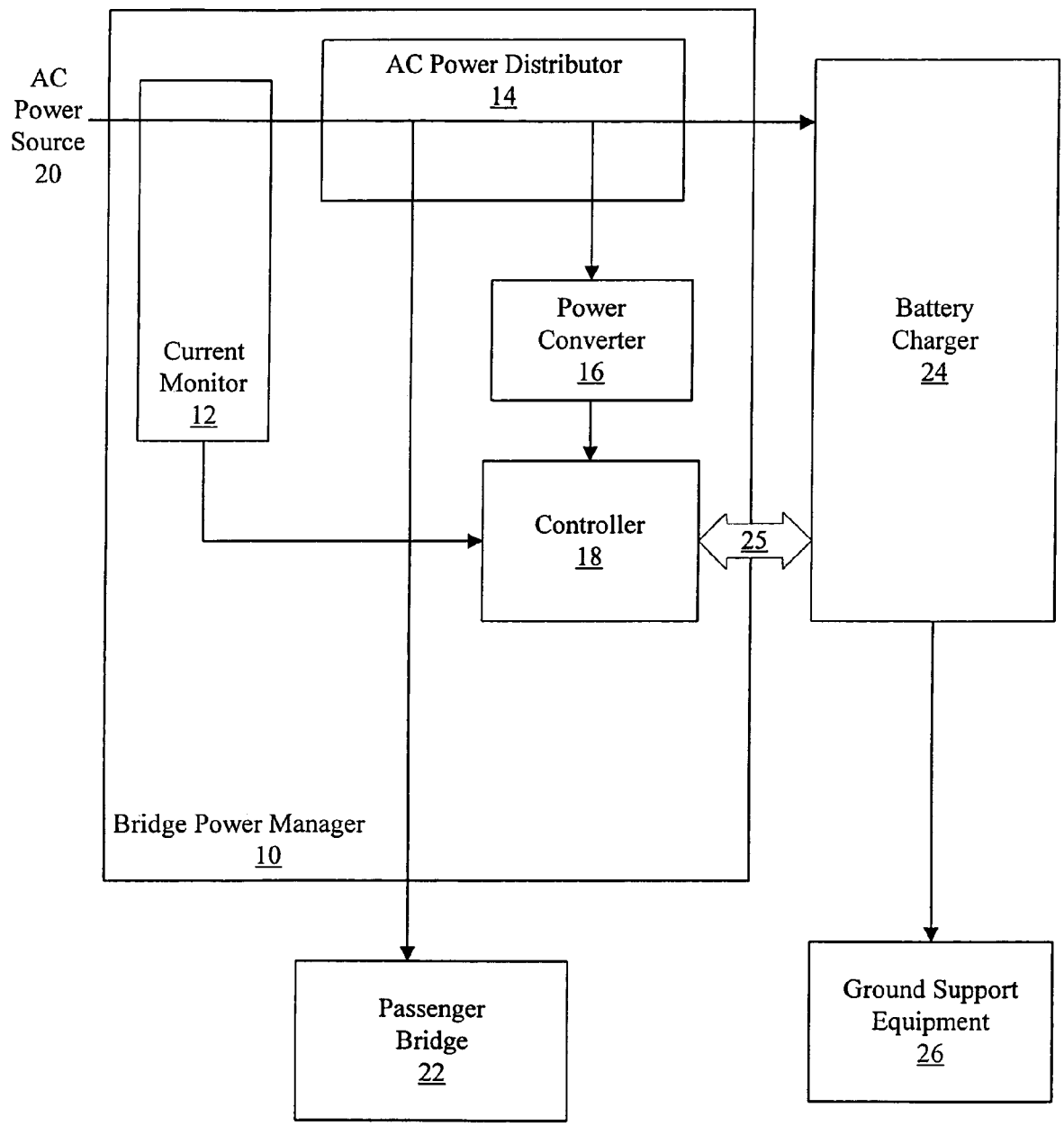
FIG. 1 is a functional block diagram of a preferred embodiment of an apparatus in accordance with the present invention.
Figure 2:
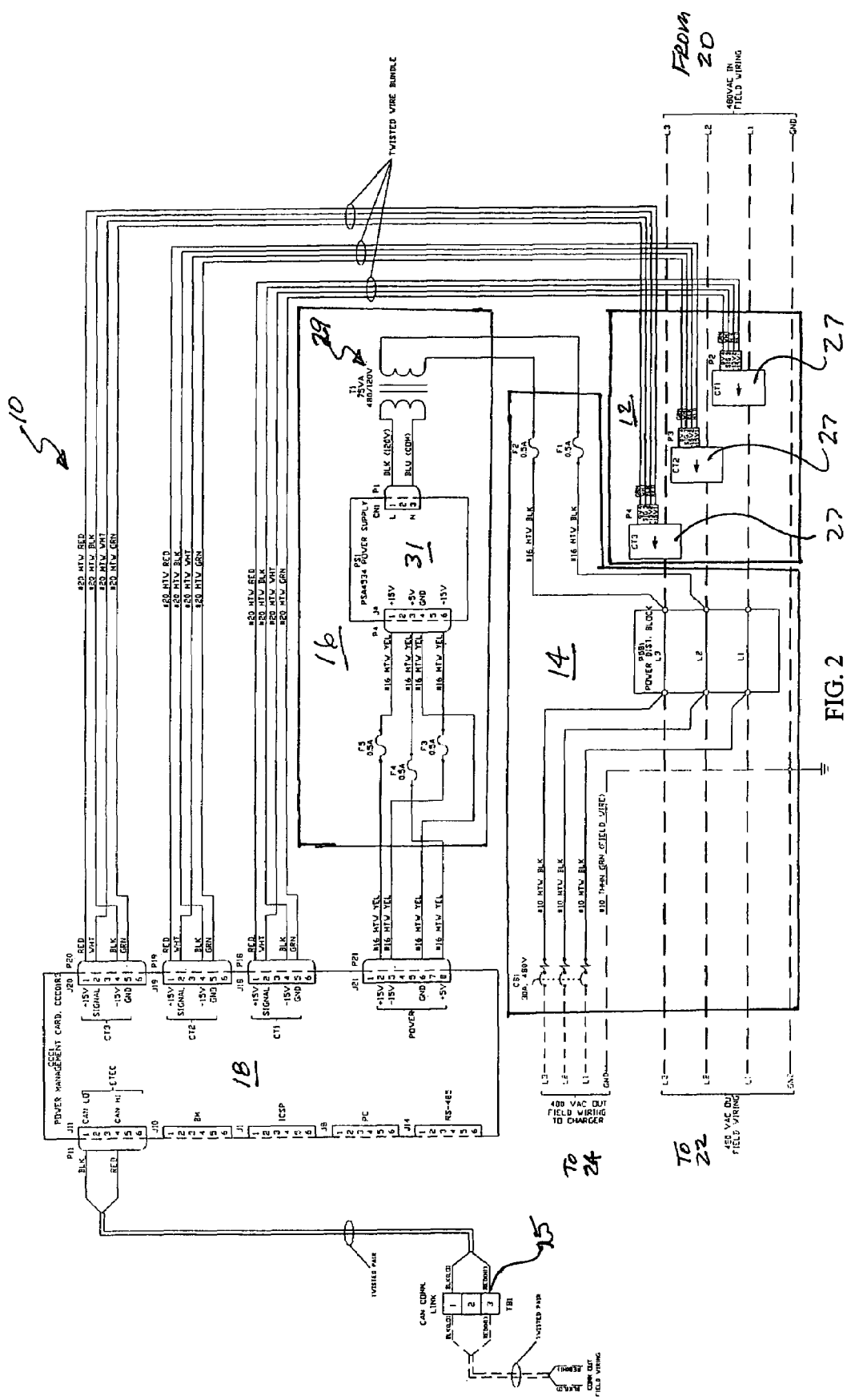
FIG. 2 is a schematic diagram of the apparatus of FIG. 1.

FIGS. 1 and 2 illustrate such a preferred embodiment of a bridge power manager 10 according to the invention for managing power to a passenger bridge and a battery charger is for airport electric ground support equipment.

Referring to FIGS. 1 and 2, the bridge power manager 10 comprises a current monitor 12, a power distributor 14, a power converter 16, and a controller 18. The bridge power manager 10 receives power from an AC power source 20, which is electrically coupled to the input of the power distributor 14. The power distributor 14 is electrically coupled to a passenger bridge 22 and a battery charger 24 to provide AC power to the passenger bridge 22 and the battery charger 24. The power distributor also is electrically coupled to and provides AC power to a power converter 16. The power converter 16 converts AC power to DC power, which it supplies to energize the controller 18. The current monitor 12 is electromagnetically coupled with the AC power supply 20 to measure the current drawn by the bridge power manager 10. The controller 18 communicates with control circuitry of the battery charger 24 via a communication link 25. The battery charger 24 is electrically coupled to one or more pieces of ground support equipment 26 to charge the batteries of that equipment.

Still referring to FIGS. 1 and 2, in a typical use of the bridge power manager 10 the AC power source 20 is the electrical power source that provides power directly to the passenger bridge 22. Typically, the AC power source 20 is a 480 VAC, three phase, power source as is widely known in the industry. In the configuration of FIGS. 1 and 2, however, the bridge power manager 10 utilizes the AC power source 20 to provide electrical power to the battery charger 24 in addition to the passenger bridge 22. With the battery charger 24 configured to derive its electrical power via the bridge power manager 10, and with the battery charger 24 communicating with the bridge power manager 10 via the controller 18, the present invention provides for the sharing of the AC power 20 between the passenger bridge 22 and the battery charger 24.

The current monitor 12 measures the current drawn from the AC power source 20, including the current drawn by the bridge power manager 10, the passenger bridge 22, and the battery charger 24. This current measurement corresponds with the total power consumption of the system shown in FIG. 1. The current measurement information is provided to the controller 18 for use in the power management process described below. As shown in FIG. 2, in a preferred embodiment, the current monitor 12 includes three current transducers 27, each of which monitors one of the three phases of the 480 VAC power. One suitable current transducer for this purpose is the HAL 100-S Hall Effect current transducer manufactured by LEM USA, Inc., of Milwaukee, Wis. Upon reading this description, it will occur to those skilled in the art that other suitable current measurement techniques and devices may be used to monitor the total current drawn by the passenger bridge 22. Also upon reading this description, it will occur to those skilled in the art that other suitable power measurement techniques and devices may be used to monitor the power consumption of the passenger bridge 22.

Also as shown in FIG. 2, a preferred embodiment of the AC power distributor 14 utilizes a variety of passive electrical devices to receive the AC power 20 and distribute it for use by the passenger bridge 22, the AC/DC power supply 16, and the battery charger 24. These passive electrical devices include a power distribution block, terminal blocks, connectors, fuses, and the like, as are well known in the art. A preferred embodiment of the power converter 16 includes a 480 VAC/120 VAC transformer 29, which converts the 480 VAC power to 120 VAC power, and a power supply 31 that converts the 120 VAC power to DC power at voltages suitable for powering the controller 18. One suitable transformer 29 is a 75481P 75 BA transformer manufactured by Jard Magnetics Corporation of North Palm Beach, Fla., and a suitable power supply 31 is the PSA-4534 power supply available from Phihong USA of Fremont, Calif.

In operation, the controller 18 receives as inputs the power consumption information provided by the current monitor 12 and charging parameters provided by the battery charger 24. In response to these inputs, as described more specifically below, the controller 18 sends control information to the battery charger 24. Still referring to FIG. 2, the controller 18 can be implemented using a microcontroller including a processor and memory. In a preferred embodiment, the controller is suitable for implementing 2510 Controlled Area Network (CAN) applications. One such microcontroller is the PIC18F8720 microcontroller from Microchip Technology, Inc., of Chandler, Ariz. The controller 18 can employ the CANopen protocol to interface with the battery charger 24. The CANopen protocol is a network technology optimized for the usage in industrial control environments, in machine internal networks and in embedded systems. The CANopen protocol is presently implemented in microcontrollers of numerous microcontroller chip manufacturers. The information flow between the controller 18 and battery charger 24 is transmitted via a CANbus network communication link 25. CANbus is a standardized network compatible with the CANopen protocol. The CANbus network is a widely used high speed serial data network engineered to exist in harsh electrical environments. It can be used by multiple microcontrollers in systems that need to communicate with each other. While the CANopen protocol and CANbus network are employed by the preferred embodiment of the invention, upon reading this description it will occur to those skilled in the art that any of a variety of communications protocols and architectures suitable for use by battery charging equipment could be used.

In one particularly advantageous embodiment, the battery charger 24 is a SuperCharger™ series battery charger manufactured by Electric Transportation Engineering Corporation of Phoenix, Ariz. SuperCharger™ battery chargers can interface with the bridge power manager 10 via the CANbus communication link 25, which can be used to adjust the charger output power setting.

Preferably, the bridge power manager 10 is housed in an enclosure suitable for housing and operating electrical circuitry in the environment of an airport passenger bridge and is mounted within the passenger bridge 22. Upon reading this description of our invention, however, a variety of other suitable configurations will occur to those skilled in the art.

The bridge power manager 10 modulates, or adjusts, the charging profile of the battery charger 24 based upon the magnitude of the AC power used and the status of the battery charger 24. This modulation of the battery charger 24 output (as opposed to simply turning the charger 24 on and off) allows the battery charger 24 to effectively share the AC power supply 20 with the passenger bridge 22 so as to ensure proper battery charging while not overloading the circuitry that provides the AC power. When more AC power is available, the output capacity of the battery charger 24 is increased. Conversely, when less AC power is available (e.g., due to increased power consumption of the passenger bridge 22), the output capacity of the battery charger 24 is reduced. In this manner, the bridge power manager 10 takes full advantage of the immediate capability of the AC power supply.

The bridge power manager 10 controls the battery charger in accordance with a method implemented by the controller 18. In the embodiment of FIG. 2, the method is implemented via a software program that is stored in suitable memory or other storage device in the controller 18 and which operates in conjunction with the microcontroller in the controller 18. According to the method, the bridge power manager 10 measures the total current drain on the AC power supply 20, reads the output power of the battery charger 24, compares the total current drain on the AC supply 20 to a predetermined operating threshold to determine whether there is an overthreshold condition, and modulates the output setting of the battery charger 24. According to a preferred method, the bridge power manager 10 integrates or filters the overthreshold condition output to avoid modulating the output setting of the battery charger in reaction to transient power spikes on the AC supply 20. Also, the bridge power manager 10 integrates the controller output command to the charger 24 in order to avoid frequent changes in the battery charger condition that may damage the battery charger 24 or reduce charging effectiveness.

Figure 3:
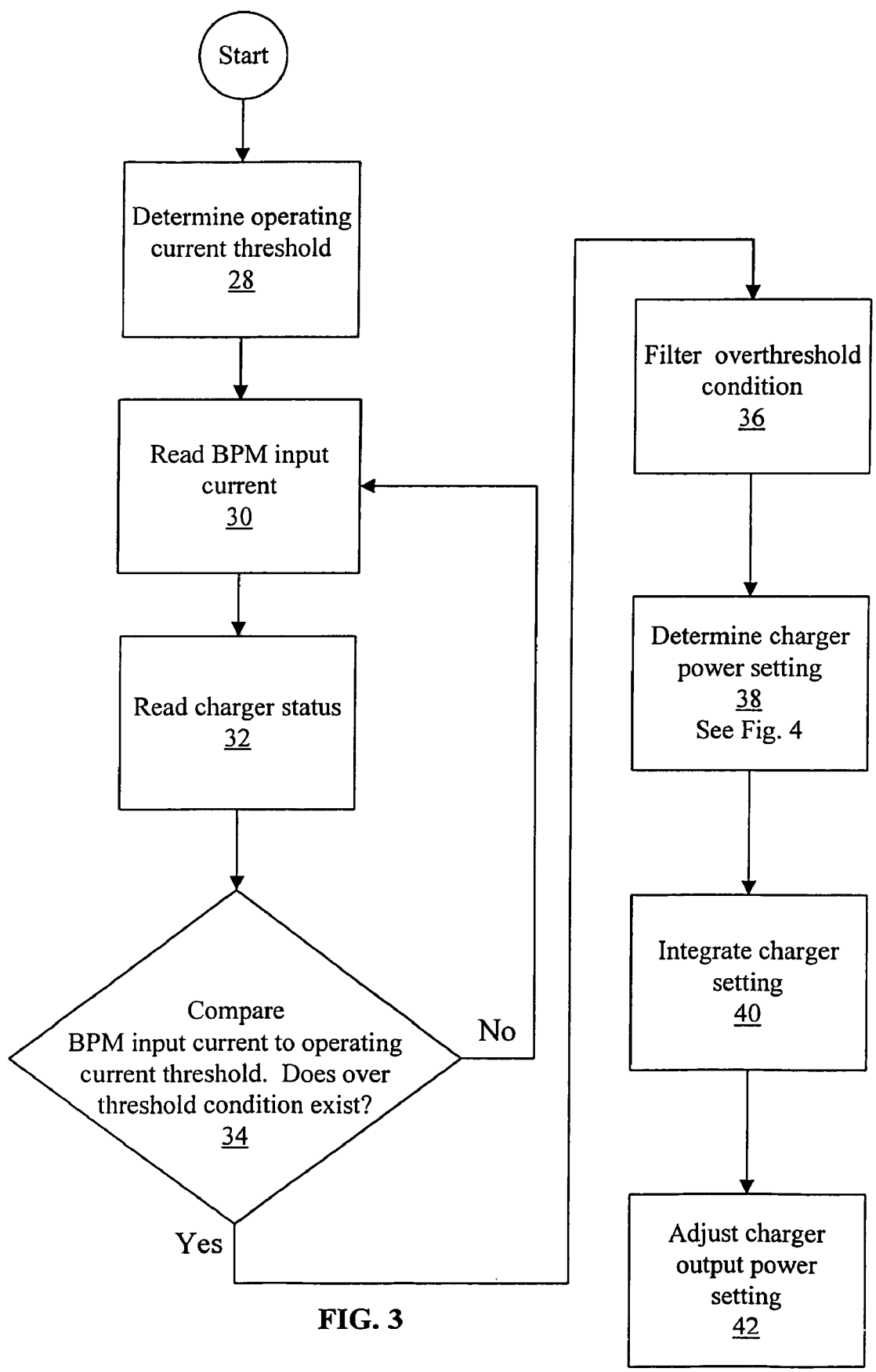
FIG. 3 is a flow diagram illustrating a process by which the apparatus of FIG. 1 can adjust the battery charger output power in response to the measured power consumption of the passenger bridge and the battery charger.

FIG. 3 is a flow diagram further illustrating the operation of the bridge power manager 10. As shown in FIG. 3, the bridge power manager 10 determines the operating current threshold of the system (step 28). According to a preferred method, the operating threshold is calculated at 80% of the current breaker protecting each of the three phases of the 480 VAC AC supply 20. By way of example, in a 60 Amp circuit, such as is typical in many passenger bridge configurations, the bridge power manager 10 determines that the operating threshold is 80%× 60 A=48 A. The 60 A breaker rating can be input to the bridge power manager 10 by way of a set of dual inline pin (DIP) switches commonly used for such purposes. In the embodiment of FIG. 2, these switches are present the controller 18 and can set by a technician or similarly trained operator when the bridge power manager 10 is installed.

The bridge power manager 10 measures the total current drain on the AC power supply 20 by reading the bridge power manager input current (step 30) by way of the current monitor 14 as previously described. According to a preferred method, each of the three phases of the AC power supply 20 are measured for one AC cycle (1/60 second) and the largest reading of the three is used as the total current measurement. The bridge power manager 10 then reads the output power of the battery charger 24 by reading the charger status (step 32). In a preferred embodiment, the output power of the battery charger 24 is communicated to the bridge power manager 10 via the CANbus communication link 25 as previously described.

The bridge power manager 10 next compares the bridge power manager input current to the operating current threshold (step 34). In the example discussed above, the current measured by the current monitor 14 is compared to 48 Amps. The bridge power manager 10 then loops to read the input current (step 30) on a continuous basis as well as filtering any overthreshold condition 36. This filtering allows the bridge power manager 10 to "ride through" any transient spikes that may exceed the circuit breaker rating for a short duration. Typically, the circuit breakers employed in passenger bridge applications will allow current spikes of up to twice the breaker rating without disconnecting the power. In a preferred method according to the invention, the overthreshold condition must be present for a minimum of two seconds before the overthreshold condition is processed. This filtering delay of two seconds may be varied for varying application or differently rated systems. Upon reading this description of our invention, those skilled in the art will understand that this delay can be readily optimized for use under these varying circumstances.

Still referring to FIG. 3, the bridge power manager 10 then modulates the output setting of the battery charger 24 by determining the charger output power setting (step 38) and adjusting that setting (step 42). According to a preferred method, the battery charger output setting is integrated (step 40) before adjusting the charger output power setting (step 42) in order inhibit excessive switching between battery charger output power modes, which excessive switching can be potentially damaging to the battery charger 24 and/or ground support equipment 26. Integration of the charger output power setting (step 40) can be tailored to be responsive to the changes in the charger output power setting determined by the controller 18. This tailoring can include permitting instantaneous reductions in the charger output power setting while allowing increase in the setting to be implemented only after a prescribed time period has elapsed. As previously discussed, this response prevents the overload of the AC supply 20 as well as damage to the battery charger 24. According to a preferred procedure, a reduced power mode time is set for one minute when the battery charger 24 enters any output power mode other than maximum output. The output power setting of the charger 24 can be raised only after the reduced power mode time has expired.

Figure 4:
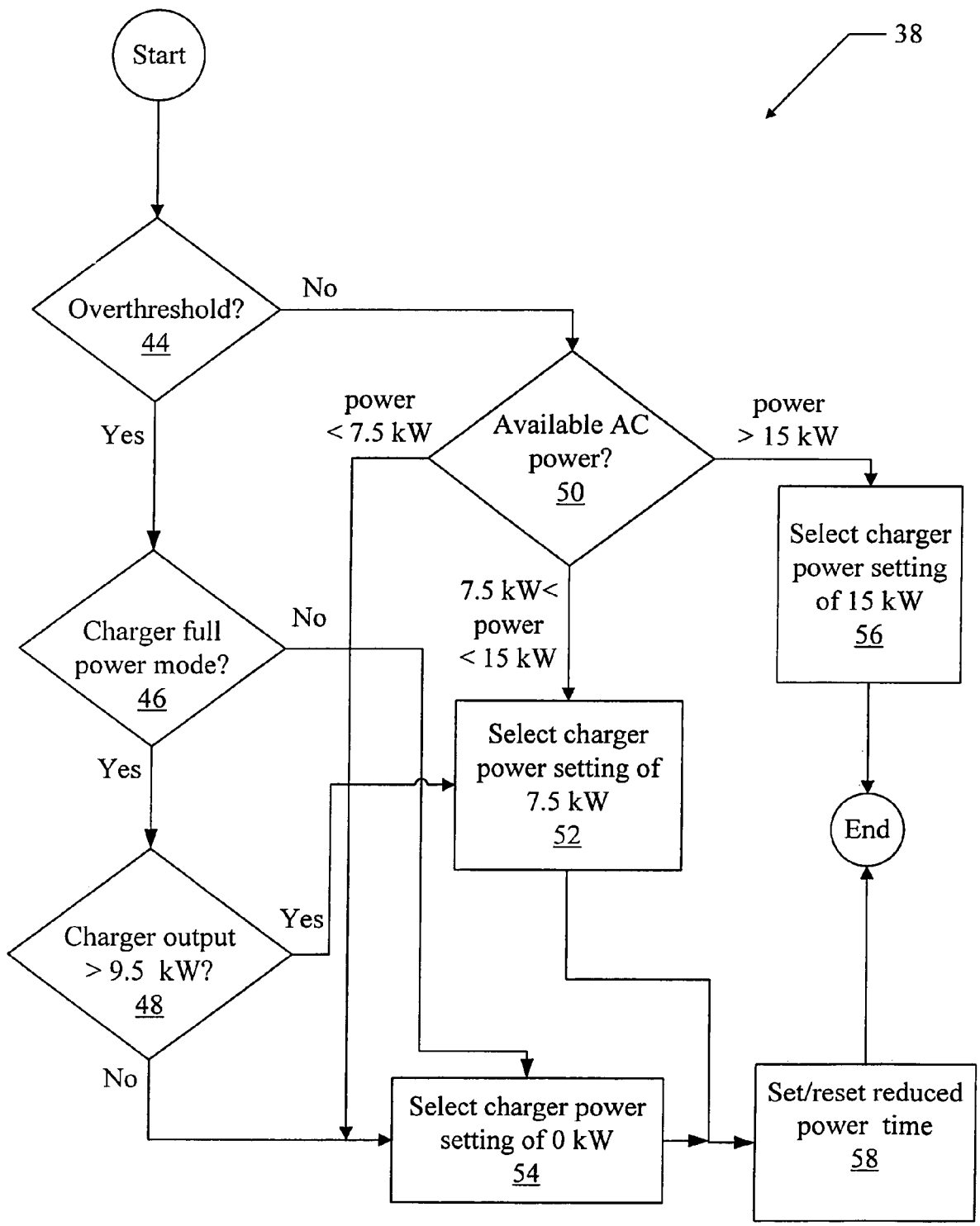
FIG. 4 is a flow diagram describing in more detail the process by which the apparatus of FIG. 1 determines the power setting of the output power setting of the battery charger.

FIG. 4 is a logical flow diagram of a preferred process used in determining the charger output power setting (step 38). According to this process, the bridge power manager 10 modulates the output setting of the battery charger 24 among full power output (15 kW), half power output (7.5 kW), and no output (0 kW). It should be noted that the present invention is not limited to three output power settings. Any number of intermediate output power settings can be implemented by the bridge power manager 10 up to and including continuous variation of the output power setting.

In determining the charger output power setting (step 38), the controller 18 first determines if an overthreshold condition exists (step 44). If an overthreshold condition is present, the controller 18 determines if the charger is in the full output power mode (step 46). In the previously described example, therefore, the controller 18 determines if the charger is set at the 15 kW setting. If the charger 24 is in the full output power mode, then the controller checks the actual output power of the charger 24 via the CANbus and compares the output power to a predetermined percentage of the full output power capability of the charger (step 48). For example, a predetermined level of 9.5 kW has been determined to be an effective level according to preferred method. This level represents 60-65% of the full output power capability of the battery charger 24. This level may be varied in alternate embodiments for a different battery charger 24 or other variations in system set-up by one skilled in the art. If the actual output power level of the battery charger 24 is less than the predetermined level (i.e., 9.5 kW), then the controller 18 selects a charger power setting of 0 kW (step 54). If the actual output power level of the battery charger 24 is greater than the predetermined level of 9.5 kW, the controller 18 selects a charger power setting of 7.5 kW (step 52). If the battery charger output is not in the full power mode (i.e., 15 kW) (step 46), then the controller 18 selects a charger power setting of 0 kW (step 54).

Referring again to step 44, if the controller 18 determines that an overthreshold condition does not exist, the controller 18 then calculates the amount of AC power available to the battery charger (step 50). This calculation can be routinely performed by the controller 18 using the current information obtained from the current monitor 14 and the operating threshold as previously described. For the example being discussed, if the output power available to the battery charger 24 is less than 7.5 kW, then the controller 18 selects a charger power setting of 0 kW (step 54). If the output power available to the battery charger 24 is between 7.5 kW and 15 kW, then the controller 18 selects a charger power setting of 7.5 kW (step 52). If the output power available to the battery charger 24 is greater than 15 kW, then the controller 18 selects a charger power setting of 15 kW (step 56). After a setting of 15 kW is selected in step 56, the process of FIG. 4 for determining the charger output power setting ends and the controller 18 then integrates the charger setting (step 40 of FIG. 3) as previously described.

Still referring to FIG. 4, when the controller 18 selects a charger power setting of 0 kW (step 54) or 7.5 kW (step 52), the bridge power manager 10 enters the reduced power mode and the controller 18 sets (or resets) the reduced power time (step 58) and integrates the charger setting (step 40 of FIG. 3). According to a preferred method, the reduced power time is one minute as described above. If a reduced power mode is selected and the reduced power mode time has not expired, the time is reset to one minute and the controller integrates the charger setting (step 40).

The apparatus and method of our invention need not be limited to use with a passenger bridge. Rather, the bridge power manager 10 can be connected between the AC power supply 20 and any electrical load, allowing the battery charger 24 to share power from the AC power supply 20. As previously discussed, it is most advantageous to share power with equipment that has a short duty cycle such that maximum power is available to the batter charger 24 most of the time. The application of the invention in any situation where the existing power supply is used on a short duty cycle can eliminate the need for installing a new power supply for the battery charger 24. Moreover, the bridge power manager 10 could supply a distribution panel to which several chargers 24 are connected, rather than supplying one charger 24 directly. This would allow one bridge power manager 10 to control several chargers 24 and make the maximum use of an electrical supply by maintaining it at nearly full current (or power) at all times using the connected charger loads.

From the foregoing, it can be seen that the present invention provides a number of advantages over the previously known art. The invention provides an apparatus and method for effectively and inexpensively supplying electrical power to airport ground support equipment battery chargers. The present invention also provides an apparatus and method that efficiently shares an existing electrical power source between an airport passenger bridge and a battery charger supporting ground support equipment. Additionally, the invention provides an apparatus and method that is fully extensible to include two or more airport passenger bridges and that is fully extensible to include two or more battery chargers supporting ground support equipment. Further, the present invention allows the sharing of power between any AC load and one or more battery chargers.

The invention in its broader aspects is not limited to the specific details, representative devices, and illustrative examples shown and described. Those skilled in the art will appreciate that numerous changes and modifications may be made to the preferred embodiments of the invention and that such changes and modifications may be made without departing from the spirit of the invention.

What is claimed is:

1. An apparatus for managing input power between a passenger bridge and a battery charger having a controllable output power setting, the apparatus comprising:
   a power distributor having an input for receiving input power, a bridge power output for coupling to a power input of the passenger bridge and a charger output for coupling to a power input of the battery charger;
   and a controller configured to adjust the output power setting of the battery charger in response to the power consumption of the passenger bridge and the battery charger.

2. The apparatus of claim 1 further comprising a current monitor configured to measure current drawn by the passenger bridge and the battery charger and coupled to the controller to provide a signal indicative of the power consumption of the passenger bridge and the battery charger.

3. The apparatus of claim 1 wherein the controller is configured to: read the output power of the battery charger; compare the power consumption of the passenger bridge and the battery charger to a predetermined operating threshold to determine whether an overthreshold condition exists; and modulate the battery charger output power setting in response to the determination whether an overthreshold condition exists.

4. The apparatus of claim 3 wherein the controller is further configured to inhibit modulation of the battery charger output power setting in response to transient power spikes.

5. The apparatus of claim 3 wherein the controller is further configured to inhibit modulation of the battery charger output power setting to prevent damage to the battery charge.

6. The apparatus of claim 1 wherein the controller is coupled to the battery charger via a serial communications link.

7. The apparatus of claim 6 wherein the communications link comprises a CANbus communications link.

8. The apparatus of claim 1 wherein the battery charger is configured to charge ground support equipment.

9. An apparatus for managing input power between a first load and a battery charger having a charging output power setting that varies in response to a control input, comprising:
   a power distributor having an input for receiving input power, a first power output for coupling to a power input of the first load and a charger output for coupling to a power input of the battery charger; and
   a controller configured to vary the charging output power setting of the battery charger by providing a control input signal to the battery charger in response to the power consumption of the first load.

10. The apparatus of claim 9 wherein the first load comprises a passenger bridge.

11. The apparatus of claim 9 wherein the battery charger is configured to charge ground support equipment.

12. The apparatus of claim 9 wherein the controller is configured to: read the output power of the battery charger; compare the power consumption of the first load and the battery charger to a predetermined operating threshold to determine whether an overthreshold condition exists; and modulate the battery charger output power setting in response to the determination whether an overthreshold condition exists.

13. The apparatus of claim 9 wherein the controller is further configured to inhibit modulation of the battery charger output power setting in response to transient power spikes.

14. The apparatus of claim 9 wherein the controller is further configured to inhibit modulation of the battery charger output power setting that may damage the battery charger.

15. The apparatus of claim 9 wherein the controller is coupled to the battery charger via a serial communications link.

16. The apparatus of claim 15 wherein the communications link comprises a CANbus communications link.

17. A method for managing input power between a passenger bridge and a battery charger having a controllable output power level, the method comprising:
   taking a measurement indicative of power consumption of the passenger bridge and the battery charger;
   using the measurement indicative of power consumption of the passenger bridge to vary the output power level of the battery charger.

18. The method of claim 17 wherein the step of taking a measurement indicative of power consumption of the passenger bridge and the battery charger comprises measuring the current drawn by the passenger bridge and the battery charger.

19. The method of claim 17 wherein the step of using the measurement indicative of power consumption comprises: reading the output power of the battery charger; comparing the power consumption of the first load and the battery charger to a predetermined operating threshold to determine whether an overthreshold condition exists; and modulating the battery charger output power setting in response to the determination whether an overthreshold condition exists.

20. The method of claim 19 wherein the step of modulating the battery charger comprises adjusting the battery charger output setting to one of a plurality of output power setting levels.

21. The method of claim 19 further comprising providing an overthreshold signal indicative of whether an overthreshold condition exists and integrating the overthreshold signal.

22. The method of claim 21 wherein the step of modulating the battery charger output power setting comprises using the integrated overthreshold signal to adjust the battery charger output setting.

* * * * *